(12) United States Patent
Ouellette et al.

(10) Patent No.: US 7,359,324 B1
(45) Date of Patent: Apr. 15, 2008

(54) ADAPTIVE JITTER BUFFER CONTROL

(75) Inventors: Michel Ouellette, Plantagenet (CA); Delfin Montuno, Kanata (CA); James Aweya, Kanata (CA); Kent Felske, Kanata (CA)

(73) Assignee: Nortel Networks Limited (CA)

( * ) Notice: Subject to any disclaimer, the term of this patent is extended or adjusted under 35 U.S.C. 154(b) by 776 days.

(21) Appl. No.: 10/796,321

(22) Filed: Mar. 9, 2004

(51) Int. Cl.
*H04L 12/26* (2006.01)

(52) U.S. Cl. ..................... 370/230; 370/235

(58) Field of Classification Search ............... None
See application file for complete search history.

(56) References Cited

U.S. PATENT DOCUMENTS

| | | | |
|---|---|---|---|
| 6,618,399 B1 * | 9/2003 | Buckland et al. | 370/516 |
| 6,850,537 B2 * | 2/2005 | Kuriki et al. | 370/429 |
| 7,006,511 B2 * | 2/2006 | Lanzafame et al. | 370/412 |
| 7,106,758 B2 * | 9/2006 | Belk et al. | 370/503 |
| 7,173,947 B1 * | 2/2007 | Ramakrishnan et al. | 370/537 |

* cited by examiner

*Primary Examiner*—Brian Nguyen
(74) *Attorney, Agent, or Firm*—Anderson Gorecki & Manaras LLP

(57) ABSTRACT

A method for dynamically adjusting jitter buffer size according to buffer fill dynamics is disclosed. In one embodiment, an upper threshold and lower threshold for the jitter buffer are identified, wherein the lower buffer threshold identifies a minimum desirable number of packets in the jitter buffer, and the upper buffer threshold identifies a maximum desirable number of packets in the jitter buffer. Operating characteristics of the jitter buffer are monitored to identify instances when the jitter buffer size falls below or exceeds the desired thresholds. When a threshold is crossed, the adaptive algorithm alters the playback offset time, by introducing or deleting packets into the transmission path, to allow the jitter buffer size to return to a desirable target size within the threshold boundaries.

18 Claims, 3 Drawing Sheets

ADAPTIVE JITTER BUFFER CONTROL

FIELD OF THE INVENTION

This invention relates generally to the field of data transmission and more particularly to a method and apparatus for maintaining a desired amount of data in a buffer.

BACKGROUND OF THE INVENTION

The goal of any communication system is to transmit real-time signals from one location to another. Currently, there are two types of networks that can be used to convey real-time media signals; circuit switched networks and packet switched networks. A circuit switched network provides a dedicated point to point communication path between two or more users. A media signal is transmitted over the dedicated circuit, received by the other side and played out to a user. A packet switched network, in contrast, divides a message to be sent into data packets, sent individually over the network, and reassembled at a final location before being delivered to a user. To ensure proper re-assembly of the blocks of data at the receiving end, various control data, such as sequence and verification information, may be appended to each packet in the form of a packet header, or otherwise associated with the packet. At the receiving end, the packets are then reassembled and transmitted to an end user in a format compatible with the user's equipment.

Packet switched networks are now competing with conventional circuit switched networks to provide interactive communications services such as telephony and multi-media conferencing via the Internet. This technology is presently known as internet telephony, IP telephony or, where voice is involved, Voice over IP (VoIP). In VoIP networks, audio signals are digitized into frames and transmitted as packets over an IP network. The transmitter may send these packets at a constant transmission rate. An appropriately configured receiver will receive the packets, extract the frames of digital data and convert the digital data into analog output using a digital to analog (D/A) converter. Although the packets are transmitted at a constant data rate, packets will not necessarily arrive at their destination at a constant rate. Rather, because of variable delays through the network, and different transmit paths taken by packets, there is a packet delay variation (pdv) at the receiver. Because a digital audio data (for example a digitized voice conversation) must be played out at a constant output rate in order to reconstruct a high quality audio signal, the delay variation between packets is undesirable.

A known solution for this problem is to implement a jitter buffer in the receiver. A jitter buffer is a buffer that stores frames as they are received from the network, and outputs them at a constant output rate, thus absorbing the packet delay variation. As long as the average rate of reception of the packets is equal to the constant output rate, the jitter buffer allows the packets to be output at the constant output rate even though they are not necessarily received at a constant rate. The jitter buffer by its nature introduces delay into the communication path; that is there is a delay while the packet travels through the jitter buffer until it is processed, or 'played out' at the receiver. The delay between receipt of the packet and the play out of the packet is referred to hereinafter as the play out time offset of the receiver.

In the context of interactive real-time communications such as internet telephony, delay is particularly problematic, since participants to such communications expect the network connection to simulate immediate, in-person interaction, without delay. Provided with more than a maximum tolerable end-to-end delay (a matter of design choice), conversation participants may be faced with the unsettling experience of having to wait some time after one person speaks before the other person hears what was spoken. Consequently, in most telecommunications networks carrying real-time media signals, there is a need to reduce or minimize the total end to end transmission delay. One method of doing so is to control the size of the jitter buffer.

The jitter buffer should be large enough to store a sufficient number of packets to insure that the slowest data in an audio sequence has sufficient time to arrive at the receiver before playback. Too small a jitter buffer can give rise to packet loss, which produces audible pops and clicks and other distortion. However, a large jitter buffer increases the playout time offset, resulting in echo and talker overlap in the received signal.

Several different methods have been used to adapt the jitter buffer size during operation to ensure optimum capture of packets while minimizing delay. For example, in one system, the variation of packet level in the jitter buffer is measured over a long period of time, and the jitter buffer size is incrementally adapted to match the calculated jitter. Such a system works well in transmission networks that provide consistent packet performance, such as Asynchronous Transfer Mode (ATM) networks, but are not as useful in systems with highly variable packet inter-arrival times.

A second approach for adapting the jitter buffer size is to count the number of packet that arrive late, and create a ratio of these packets to the number of packets successfully processed. The ratio is used to adjust the jitter buffer to target a predetermined allowable packet ratio. This approach works best with networks having highly variable packet inter-arrival times, such as IP networks, but is not as efficient in system having consistent packet arrival times, such as ATM networks.

It would be desirable to identify a method and system for adaptively selecting jitter buffer size that is useful in a variety of transmission systems.

SUMMARY OF THE INVENTION

The present invention provides a method for dynamically adjusting jitter buffer size according to buffer fill dynamics. According to one embodiment, an upper threshold and lower threshold for the jitter buffer are identified, wherein the lower buffer threshold identifies a minimum desirable number of packets in the jitter buffer, and the upper buffer threshold identifies a maximum desirable number of packets in the jitter buffer. At any time, if the jitter buffer is only storing a number of packets that is below the lower threshold when it is time to play out a received packet sequence, then the time offset is considered too small. An adaptive controller causes dummy packets to be inserted in the output data stream to permit the jitter buffer to fill to a desirable level. If the buffer always has packets above the upper threshold, then the play out time offset is considered to be too large. The adaptive controller reduces the number of packets maintained in the buffer to below the threshold by discarding a number of packets at the head of the buffer or speeding up playout, thereby reducing the playout time offset. The ideal buffer size is somewhere between the two thresholds, and the adaptive algorithm ensures that the number of packets is within threshold bounds.

According to one aspect of the invention, and apparatus includes a controller, a buffer, coupled to the controller, the buffer having a target fullness associated therewith and providing the controller with current fullness indications; and wherein the controller includes means for collecting the current fullness indications and means for periodically updating the target fullness of the buffer in response to the current fullness indications.

According to another aspect of the invention, a method for adapting a size of a buffer including the steps of monitoring a fullness of the buffer to track fullness characteristics of the buffer and periodically adjusting the size of the buffer in response to the fullness characteristics of the buffer.

According to a further aspect of the invention, a method for adapting a size of a buffer capable of receiving packets includes the steps of identifying a target fullness of the buffer, the target fullness indicating a desired number of packets to be stored in the buffer, assigning an upper threshold and lower threshold to the buffer, the upper threshold indicating a maximum number of packets to be stored in the buffer, and the lower threshold indicating a minimum number of packets to be stored in the buffer, monitoring the buffer for a time interval to obtain fullness characteristics of the buffer; and adjusting the target fullness of the buffer in response to the fullness characteristics of the buffer.

DETAILED DESCRIPTION

Figure 1:
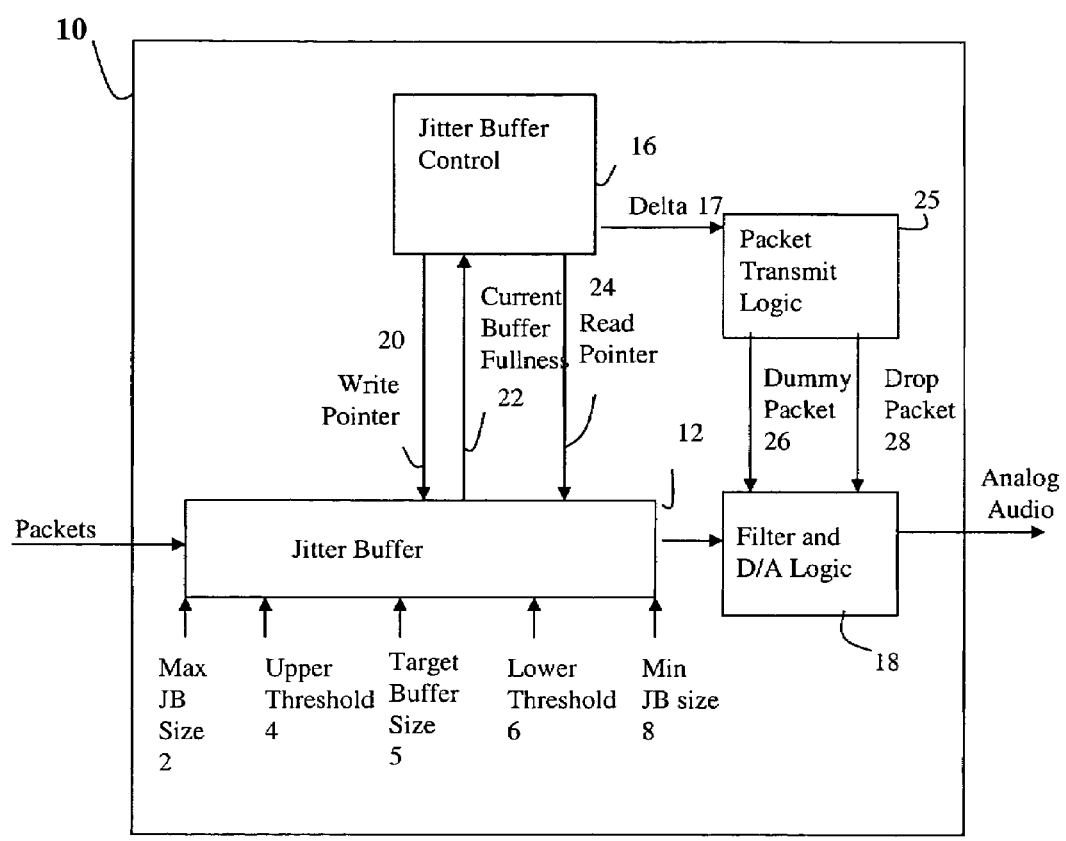
FIG. 1 is a block diagram of a device, such as a voice or video decoder, in which the adaptive jitter buffer controller of the present invention may be implemented.

Referring now to FIG. 1, a block diagram of a device 10 that may be included in a receiver in a packet based network is shown. The embodiment described below will refer to packets that are received in a Voice Over Internet Protocol (VOIP) network device, however it should be appreciated that the below concepts may be expanded for use in any system whereby units of data are received at a device and it is desirable to monitor and update the characteristics of the buffer that stores the received units of data. Accordingly, the use of the terms 'packet' and VOIP network are exemplary only, and not a limitation of the present invention.

In addition, it should be noted that the attached description and drawings refer to several functional blocks or flow diagram steps that each perform a described function. The delineation of functionality between the blocks or steps has been described herein for exemplary purposes only, and it should be understood that the same functionality may be obtained through the use of differently arranged components and processes. Accordingly, the present invention is not limited to the discrete components or flow diagram steps, but rather encompasses all equivalent method or means for performing a similar function.

In a VOIP network, the device 10 may be a voice decoder or any device that collects digital packets and converts them for audio reproduction. The device 10 is shown to include a jitter buffer 12, for temporary storage of packets received from the network. According to one aspect of the invention,
associated with the jitter buffer are a number of variables identifying characteristics of the jitter buffer. The variables include Max_JB_Size 2, Upper_Threshold 4, Target_JB_Size 5, Lower_Threshold 6 and Min_JB_Size 8. The Max_JB Size is the physical maximum size of the jitter buffer, and the Min_JB_Size 8 is the physical minimum size of the jitter buffer. The Target_JB_Size 5 identifies a desirable number of packets which should be stored in the jitter buffer at any time to provide desirable system performance in terms of packet delay and loss characteristics. The Target_JB_Size 5 may be initially set by the user. The Upper threshold is a selected upper bound size of the jitter buffer. When the size of the jitter buffer exceeds this threshold, the jitter buffer is approaching maximum capacity, thus approaching a maximum playback offset and packet loss scenario. Similarly, the Lower_Threshold is a selected lower bound size of the jitter buffer. When the number of packets in the jitter buffer falls below this threshold, there may not be enough packets in the jitter buffer to support a steady stream of audio output, thus introducing undesirable pops, crackles or delays in the voice transmission.

One aspect of the present invention is the adaptive process which is used to ensure that the number of packets in the jitter buffer remains within the Upper and Lower thresholds. In one embodiment, the adaptive process is controlled by the jitter buffer controller 16. As shown in FIG. 1, the jitter buffer controller 16 controls access to the jitter buffer 12 by maintaining a current read point 24 and write pointer 20 to the buffer. The jitter buffer controller 16 also monitors the jitter buffer to identify a current buffer fullness 22, identifying a number of packets in the jitter buffer at a given time. The current buffer fullness 22 can be easily tracked by the controller monitoring a count of packets read into the buffer less a count of packets output from the buffer, although other methods can also be used. It can be updated on each read to or write from the jitter buffer. The jitter buffer controller monitors the current buffer fullness during a periodic interval. The periodic interval is selected to be short enough to capture highly variable packet arrival time. At the end of the periodic interval, the jitter buffer controller 16 analyzes the fullness characteristics of the buffer during the time interval to determine whether the number of packets maintained in the buffer provides a desirable playback offset of the received signal to be maintained.

After analyzing the fullness characteristics of the buffer for the interval, the jitter buffer controller forwards a value Delta on signal line 17 to packet transmit logic 25. The packet transmit logic 25 controls the playback of the packets from the jitter buffer. In one embodiment, the packet transmit logic increases the packet offset delay by inserting dummy packets into the transmission path. As the dummy packets are inserted into the receiver data stream, the jitter buffer fills to a desirable level. In another embodiment, the packet transmit logic selectively drops packets from the jitter buffer, in order to decrease the packet offset delay. As the network traffic and jitter buffer characteristics change during operation, the jitter buffer controller continually updates the Delta value forwarded to the packet transmit logic. With such an arrangement, a system is provided that permits the jitter buffer size to be maintained within a desirable range to satisfy system performance requirements. The system of the present invention is a closed loop system which iteratively uses dynamic jitter buffer characteristics to adapt the jitter buffer size. Thus the present invention is easier to implement than several prior art systems which record round-trip packet transmission times, arrival rates, etc.

Figure 2:
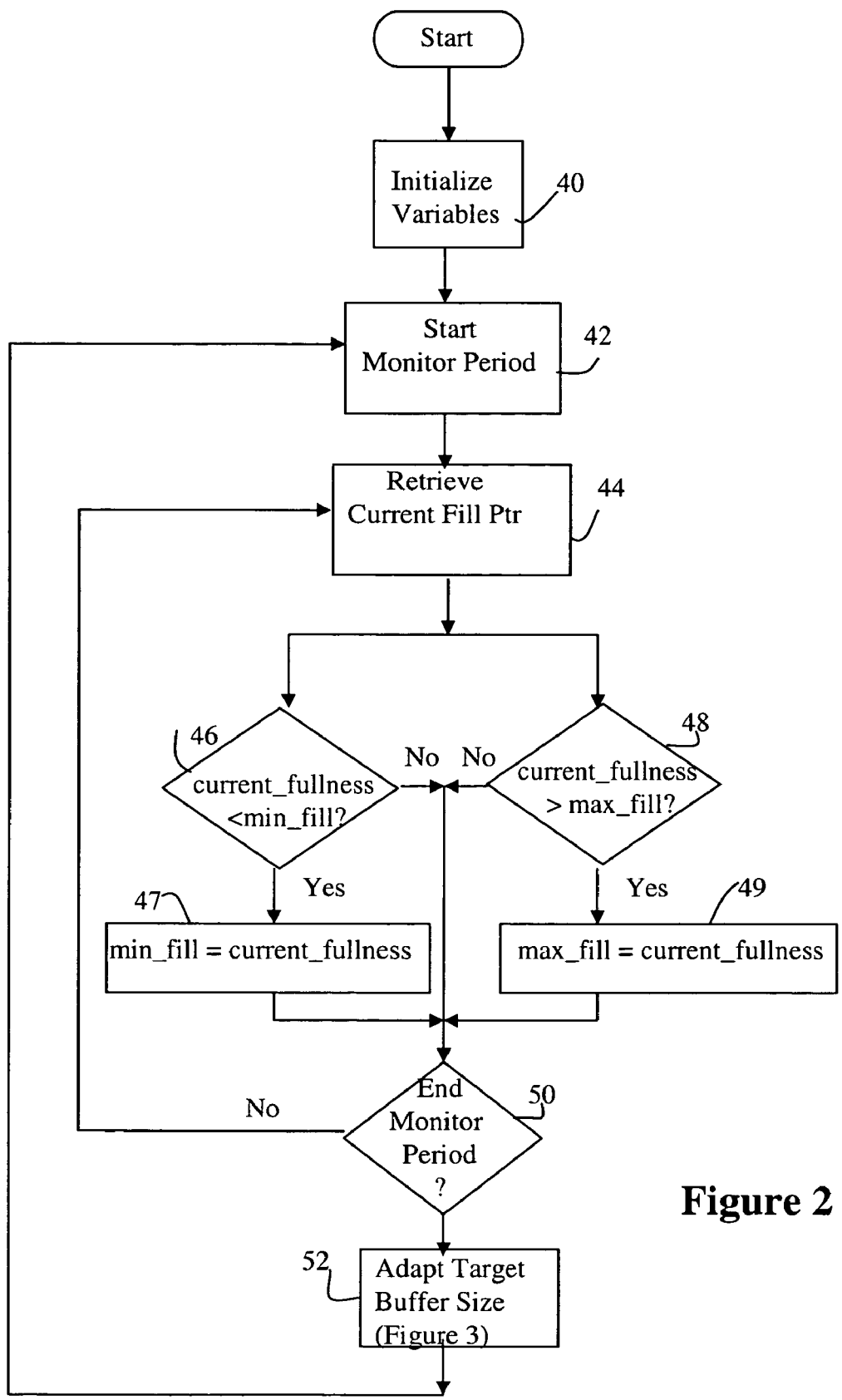
FIG. 2 is a flow diagram illustrating exemplary steps that may be undertaken to monitor and record dynamic jitter buffer characteristics.
Figure 3:
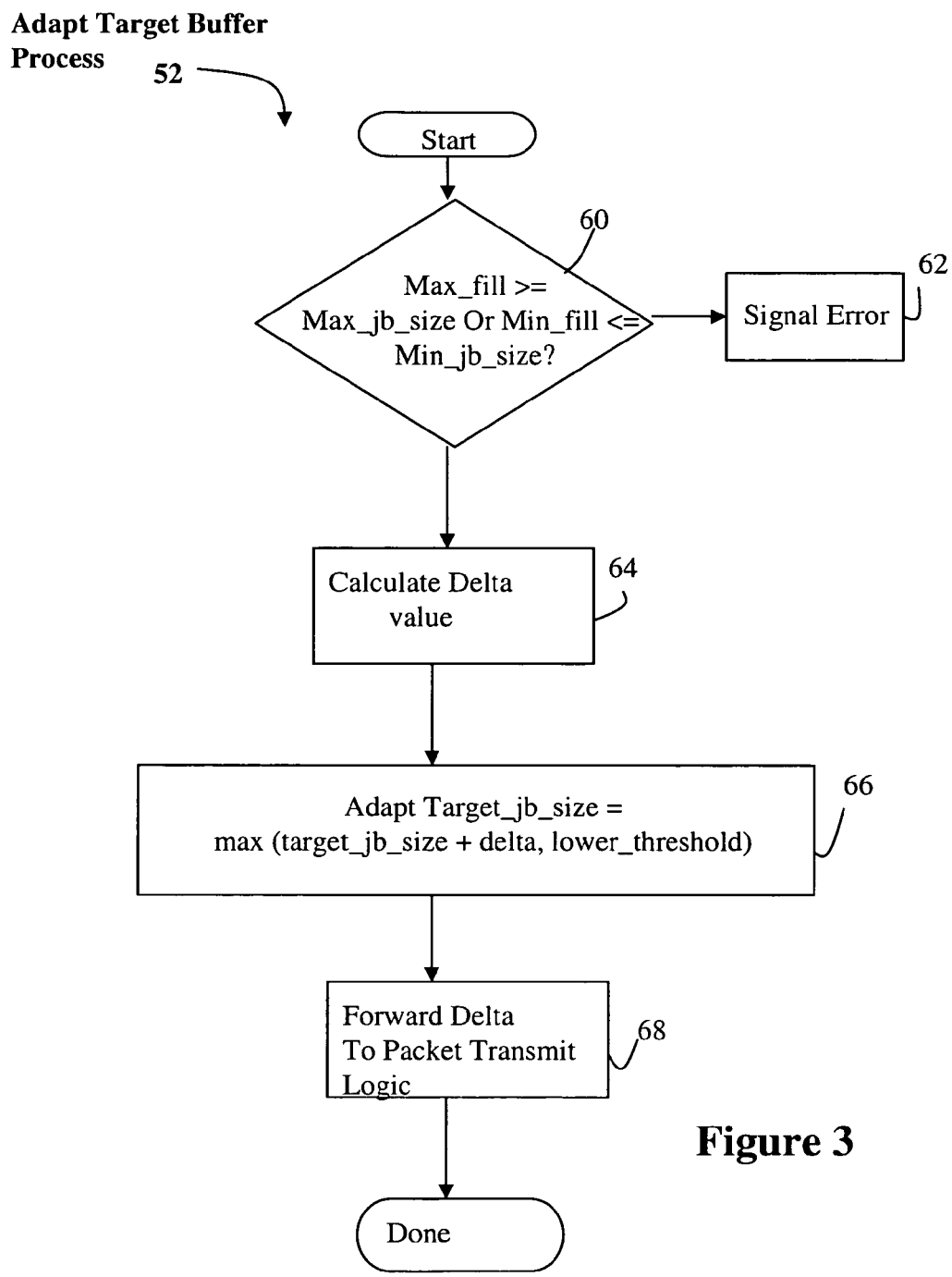
FIG. 3 is a flow diagram illustrating exemplary steps that may be taken by the adaptive jitter buffer controller of the present invention to maintain jitter buffer size between desired thresholds.

Referring now to FIGS. 2 and 3, block diagrams illustrating exemplary steps that may be taken to adapt jitter buffer size using dynamic buffer characteristics will now be described. FIG. 2 illustrates steps that are taken during a monitoring interval, while FIG. 3 illustrates steps that may be taken to modify packet handling at the device in order to restore the jitter buffer to a desired threshold.

In FIG. 2, at step 40, several variables that are used by the jitter buffer controller are initialized. These variables are used during the monitoring process, and include operational limits defining the Target_Jitter_Buffer_Size, Upper_Threshold and Lower_Threshold values for the jitter buffer. In one embodiment, as mentioned above, the Target_Jitter_Buffer_Size indicates the desirable number of packets that should be maintained in the jitter buffer to ensure that desirable delay and packet loss performance is achieved. The Upper_Threshold is determined by applying an 'above target' multiplier to the Target_Jitter_Buffer_Size to identify a maximum number of packets in excess of the target that are permissible. Similarly, the Lower_Threshold is determined by applying a 'below target' multiplier to the Target_Buffer_Size to identify a minimum number of packets below the target that are permissible. These values may be user entered, or calculated and updated by a computer program in response to ongoing network traffic analysis.

The jitter buffer controller also uses tracking variables to track the characteristics of the jitter buffer during the monitoring interval. The tracking variables include min_fill and max_fill. The min_fill variable identifies the minimum number of packets that are in the jitter buffer during the monitoring interval, and the max_fill variable identifies the maximum number of packets that were stored in the jitter buffer during the monitoring interval. At initialization, the min_full variable is set equal to the Max_JB_Size value, and the max_fill variable is set equal to the Min_JB_Size value.

After the variables are initialized at step 40, the monitoring process is started at step 42. As mentioned above, the current buffer fullness information is collected for the jitter buffer over the periodic monitoring interval. The current fullness data may be collected at a set time interval, or it may be collected each time a packet is written to the buffer, each time a packet is read from the buffer, or some combination thereof. The duration of the monitoring interval is a matter of design choice, depending upon the resources which are available in the design for storing and processing the current fullness data.

At step 44, the current buffer fullness status is retrieved by the jitter buffer controller. At steps 46 and 48, it is determined, respectively, whether the current buffer fullness is less than the current min_fill value, and whether the current buffer fullness exceeds the current max_fill value. If it is determined that the current fullness is less than the current min_fill value, the min_full value is overwritten with the current fullness value at step 47. Alternatively, if it is determined that the current fullness is greater than the current max_fill value, the max_full value is overwritten with the current fullness value at step 49.

At step 50, it is determined whether the monitoring period has ended. If not, at the process returns to step 44 to retrieve more current fullness data. When the monitoring interval ends, the process proceeds to step 52, where the collected data is analyzed by adaptive control logic in the jitter buffer control logic.

Step 52 is shown in more detail in FIG. 3. At step 60, it is first determined whether the physical capabilities of the jitter buffer have been reached. This is determined by comparing the min_full result against the Min_JB_Size value, and the max_full result against the Max_JB_Size value. If the values are greater than or equal to the physical maximum and minimum of the buffer, an Error alert is forwarded to the user.

If the physical capabilities of the buffer have not been reached, then at step 64 a Delta value is calculated. The Delta value indicates a desired change in the playout time offset for the receiver. The Delta value can be calculated in a variety of ways using the known variables and retrieved min_full and max_fill values, and the present invention is not limited to any particular method of calculating the Delta. In short the Delta value calculation should use the variables to determine what changes need to be made at the receiver to result in jitter buffer fullness levels that approach the target_jitter_buffer fullness value.

For example, if it is determined that the min_fill result obtained during the monitoring process greater than or equal to the Lower_Threshold variable value, the Delta values can be calculated using below Equation I:

$$\text{Delta}_{min} = (\text{Lower\_Threshold} - \text{min\_fill})/2; \qquad \text{Equation I}$$

Alternatively, if it is determined that the min_fill result is less than or equal to the Lower_Threshold value, the Delta value can also be calculated using below Equation II:

$$\text{Delta}_{min} = (\text{Lower\_Threshold} - \text{min\_fill}) \qquad \text{Equation II}$$

The resulting Delta value of Equation II is larger than the Delta value resulting from Equation I, because there is no division by two. Thus, the action taken by the receiver to restore the jitter buffer to the desired capacity will occur more drastically with the Delta returned by Equation II, and thus playback offset delays will not be minimized at the expense of packet loss.

The Delta value is then forwarded to the Packet Transmit logic. In an embodiment where the Delta value is used to indicate an inadequate number of packets in the jitter buffer, the Delta value is used to identify a number of dummy packets that are to be played out by the receiver. There are many method of inserting dummy packets into the data stream, and the present invention is not limited to any particular implementation. For example, the Delta value may map directly to the number of dummy packets, or number of dummy packets may be a multiple of the Delta value. The dummy packets may be immediately output when the Delta value is received, or interspersed with jitter buffer packets.

In an alternate embodiment, the Delta value may be calculated to identify a number of packets in the jitter buffer in excess of the Upper_Threshold. This calculation is shown in Equation III:

$$\text{Delta}_{max} = \text{max\_fill} - \text{Upper\_Threshold}. \qquad \text{Equation III}$$

When using the Delta calculation of Equation III, the Delta number may be used to identify a number of packets to drop to bring the jitter buffer size to the desired level, and reduce the playback offset delay.

When the Delta has been calculated, at step 66 the target_buffer_size value is updated to reflect the desired buffer size given current traffic conditions. In one embodiment, the Target_JB_Size is calculated according to Equation IV below:

$$\text{Target\_JB\_Size} = \max(\text{Target\_JB\_Size} + \text{Delta}, \text{Lower\_Threshold}) \qquad \text{Equation IV}$$

The function 'max' assigns the Target_JB_Size with whichever value field is greater. Thus, in Equation IV, the Target_JB_Size can be modified, but will not be set to any value that is below the Lower_Threshold value.

An alternative method of calculating an updated Target_JB_Size is provided below in Equation V:

$$\text{Target\_JB\_Size} = \max((\max\_fill - \min\_fill)/2 - (\min\_fill - \text{Lower\_Threshold}), \text{Lower\_Threshold}) \quad \text{Equation V}$$

In Equation V, the Target_JB_Size is updated to be equal to the average jitter buffer size during the monitoring period, less the difference between the min_fill and the Lower_threshold. Thus, the Target_JB_Size is reduced to a level that minimizes packet offset delay, while ensuring that no packet loss is incurred.

Accordingly a system and method has been shown and described which controls jitter buffer fullness, and concomitantly system performance, through the use of periodic buffer characterizations. Adjustments to the packet delay offset are achieved through analysis of the dynamic buffer characteristics, and through insertion or deletion of packets in response to the characteristics. Periodic monitoring and adjustment helps to ensure that the buffer retains its desired fullness in the face of changing network traffic characteristics. The present invention thus uses local dynamic buffer characteristics to regulate jitter buffer fullness and hence system quality and performance with minimal complexity.

The above description and Figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition, the present invention is not limited to a method for controlling buffer fullness in a VOIP network, but may be used to design any buffer capable of storing units of data.

FIGS. 2 and 3 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

What is claimed is:

1. An apparatus comprising:
a controller;
a buffer, coupled to the controller, the buffer having a target fullness associated therewith and providing the controller with current fullness indications; and
wherein the controller includes means for collecting the current fullness indications and means for periodically updating the target fullness of the buffer in response to the current fullness indications, wherein the means for updating the target fullness of the buffer includes identifying a minimum fullness of the buffer over a given monitoring interval and calculating a delta value, the delta value calculated by subtracting the minimum fullness of the buffer from a lower threshold of the buffer, wherein the lower threshold identifying a minimum desired number of packets in the buffer.

2. The apparatus of claim 1, wherein the buffer has associated therewith an upper threshold, identifying a maximum desired number of packets in the buffer, and wherein the controller controls transmission of packets from the buffer if the collected current fullness indications indicate that either the upper threshold or lower threshold have been crossed.

3. The apparatus of claim 2, further comprising transmission logic for transmitting packets from the buffer, wherein the controller includes logic for causing packets to be held in the buffer if the current fullness indications indicate that the lower threshold has been crossed.

4. The apparatus of claim 2, further comprising transmission logic for transmitting packets from the buffer, wherein the controller includes logic for discarding packets in the buffer if the current fullness indications indicate that the upper threshold has been crossed.

5. The apparatus of claim 1, wherein the means for updating the target fullness of the buffer includes means for adding the delta value to the target fullness.

6. The apparatus of claim 5 further including the step of reducing the delta value if it is determined that the minimum fullness is greater than the lower threshold.

7. The apparatus of claim 1, wherein the means for updating the target fullness of the buffer includes means identifying a maximum fullness of the buffer over the given monitoring interval.

8. The apparatus of claim 7, wherein the means for updating the target fullness of the buffer includes means for calculating an average fullness of the buffer over the given monitoring interval and reducing the average fullness by a difference between the minimum fullness and the lower threshold to provide an updated target fullness.

9. A method for adapting a size of a buffer including the steps of:
monitoring a fullness of the buffer to track fullness characteristics of the buffer, wherein the fullness characteristics include a minimum fullness of the buffer and associated with the buffer is a lower threshold, identifying a minimum number of data units to be stored in the buffer; and periodically adjusting the size of the buffer in response to the fullness characteristics of the buffer including the step of comparing the minimum fullness of the buffer against the lower threshold.

10. The method of claim 9, wherein the fullness characteristics include a maximum fullness of the buffer.

11. The method of claim 9, wherein associated with the buffer is an upper threshold, identifying a desired maximum number of data units to be stored in the buffer.

12. The method of claim 11, wherein the upper threshold is selected to achieve a desired playback offset of data received at the buffer.

13. The method of claim 11, wherein the lower threshold is selected to minimize data unit loss at the buffer.

14. A method for adapting a size of a buffer including the steps of:

identifying a target fullness of the buffer, the target fullness indicating a desired number of packets to be stored in the buffer;

assigning an upper threshold and lower threshold to the buffer, the upper threshold indicating a maximum number of packets to be stored in the buffer, and the lower threshold indicating a minimum number of packets to be stored in the buffer;

monitoring the buffer for a time interval to obtain fullness characteristics of the buffer wherein the fullness characteristics of the buffer include a maximum fullness and minimum fullness of the buffer over the time interval; and adjusting the target fullness of the buffer in response to the fullness characteristics of the buffer, the step adjusting including the step of comparing the minimum fullness of the buffer against the lower threshold.

15. The method of claim 14, wherein the step of comparing the minimum fullness of the buffer against the lower threshold includes the step of calculating a delta value according to the below equation:

$$\text{Delta} = \text{minimum fullness} - \text{lower threshold}.$$

16. The method of claim 15, wherein the value of delta is further reduced for a different rate of adjustment.

17. The method of claim 14, wherein the step of adjusting includes the step of adding the delta value to the target fullness.

18. The method of claim 14, wherein the step of adjusting includes the steps of determining an average fullness of the buffer over the time interval, and subtracting the difference between the minimum fullness and the lower threshold from the determined average fullness to provide an adjusted target fullness for the buffer.

* * * * *